United States Patent
Mason

(10) Patent No.: US 9,992,076 B2
(45) Date of Patent: Jun. 5, 2018

(54) DYNAMIC CACHE ALLOCATING TECHNIQUES FOR CLOUD COMPUTING SYSTEMS

(71) Applicant: Cisco Technology, Inc., San Jose, CA (US)

(72) Inventor: Seth Mason, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 14/514,480

(22) Filed: Oct. 15, 2014

(65) Prior Publication Data
US 2016/0112281 A1 Apr. 21, 2016

(51) Int. Cl.
*G06Q 20/14* (2012.01)
*H04L 12/24* (2006.01)
(Continued)

(52) U.S. Cl.
CPC ....... *H04L 41/5051* (2013.01); *G06Q 20/145* (2013.01); *H04L 41/0896* (2013.01); *H04L 67/10* (2013.01); *H04W 4/003* (2013.01)

(58) Field of Classification Search
CPC ............... G06F 2212/62; G06F 12/084; G06F 12/0802; G06F 12/0806; G06F 12/0844; G06F 12/0871; G06F 12/0877; G06F 17/3048; G06F 2212/604; G06F 2212/6042; G06F 12/0875; G06F 2212/60; G06F 12/128; G06F 3/0631; G06F 12/0815; G06F 3/064; G06F 17/30132; G06F 2212/1016;
(Continued)

(56) References Cited

U.S. PATENT DOCUMENTS 6,590,865 B1 * 7/2003 Ibaraki .............. H04L 12/40058
370/230
8,799,322 B2 8/2014 deMilo et al.
(Continued)

OTHER PUBLICATIONS

"Spot Price" Investopedia. Nov. 4, 2013 <http://web.archive.org/web/20131104150316/http://www.investopedia.com/terms/s/spotprice/> Retrieved Mar. 27, 2017(1 page).*
(Continued)

*Primary Examiner* — Elda G Milef
(74) *Attorney, Agent, or Firm* — Edell, Shapiro & Finnan, LLC

(57) ABSTRACT

Techniques are presented herein to allow a tenant application in a cloud computing environment to automatically adjust storage infrastructure cache allocation according to performance needs and cost associated with use of the cache. Information is stored for a spot price of a cache of a storage infrastructure used for data storage in a cloud computing environment. A request is received to allocate additional cache for use by one or more applications associated with a first tenant running in the cloud computing environment. Information is sent to the one or more applications indicating a current spot price of the cache of the storage infrastructure. An instruction is received from the one or more applications to purchase the additional allocation of the cache based on the current spot price or based on a predetermined fixed price. An allocation request is sent to the storage infrastructure for additional allocation of the cache.

22 Claims, 6 Drawing Sheets

(51) Int. Cl.
*H04L 29/08* (2006.01)
*H04W 4/00* (2009.01)

(58) Field of Classification Search
CPC ..... G06F 2212/313; G06F 2009/45583; G06F 2212/283; G06F 2212/608; G06F 3/061; G06F 3/0653; G06F 3/0673; G06F 3/0683; G06F 3/0685; G06F 9/3005; G06F 12/0893; G06F 2212/1024; G06F 2212/1041; H04L 41/5051; H04L 41/0896; H04L 67/10; H04W 4/003; G06Q 20/145
See application file for complete search history.

(56) References Cited

U.S. PATENT DOCUMENTS

| | | | | |
|---|---|---|---|---|
| 9,208,032 | B1* | 12/2015 | McAlister | G06F 11/1435 |
| 9,292,454 | B2* | 3/2016 | Stairs | G06F 12/084 |
| 9,405,686 | B2* | 8/2016 | Waldspurger | G06F 12/0891 |
| 9,645,840 | B2* | 5/2017 | Ennaji | G06F 9/45533 |
| 2002/0099616 | A1* | 7/2002 | Sweldens | G06Q 40/00 705/35 |
| 2004/0111308 | A1* | 6/2004 | Yakov | G06Q 10/087 705/28 |
| 2005/0021446 | A1* | 1/2005 | Whinston | G06Q 30/08 705/37 |
| 2005/0022202 | A1 | 1/2005 | Sannapa Reddy et al. | |
| 2010/0251329 | A1 | 9/2010 | Wei | |
| 2010/0332588 | A1 | 12/2010 | Schwimer | |
| 2010/0333116 | A1 | 12/2010 | Prahlad et al. | |
| 2011/0022642 | A1 | 1/2011 | deMilo et al. | |
| 2011/0179162 | A1 | 7/2011 | Mayo et al. | |
| 2013/0060933 | A1* | 3/2013 | Tung | G06F 11/3495 709/224 |
| 2013/0138891 | A1* | 5/2013 | Chockler | G06F 9/5016 711/133 |
| 2013/0179289 | A1* | 7/2013 | Calder | G06Q 30/08 705/26.3 |
| 2013/0282540 | A1* | 10/2013 | Bliesner | G06Q 20/145 705/34 |
| 2014/0172929 | A1* | 6/2014 | Sedayao | G06F 17/30212 707/827 |
| 2014/0258634 | A1* | 9/2014 | Cudak | G06F 12/084 711/130 |
| 2016/0092255 | A1* | 3/2016 | Bernal | G06F 9/45558 718/1 |

OTHER PUBLICATIONS

Griffith, Eric. "Business Choice Awards 2014: Servers and Network Attached Storage" PCMag.com. Sep. 19, 2014 (5 pages).*
"Amazon EC2 Spot Instances" Jan. 19, 2014. <https://web.archive.org/web/20140119094045/http://aws.amazon.com/ec2/purchasing-options/spot-instances/. Retrieved Mar. 27, 2017. (20 pages).*
Lin et al. "Automatic Resource Scaling for Web Applications in the Cloud". GPC 2013, LNCS 7861, pp. 81-90, 2013 (Year: 2013).*
Nimble Storage, "The Nimble Storage Adaptive Flash Platform—Leveraging Breakthrough Technology to Deliver True Business Value," retrieved from http://www.nimblestorage.com/products/adaptive-flash.php, on Oct. 15, 2014, 4 pages.
OCZ Storage Solutions, "VXL VMware Acceleration Software," Overview, retrieved from http://ocz.com/enterprise/software/vxl-storage-accelerator-for-vmware, on Oct. 15, 2014, 2 pages.
IBM, "IBM FlashCache Storage Accelerator," IBM Systems and Technology, Data Sheet, Aug. 2013, 4 pages.
Amazon, "Amazon EC2 Spot Instances," retrieved from http://aws.amazon.com/ec2/purchasing-options/spot-instances/, on Oct. 15, 2014, 41 pages.

* cited by examiner

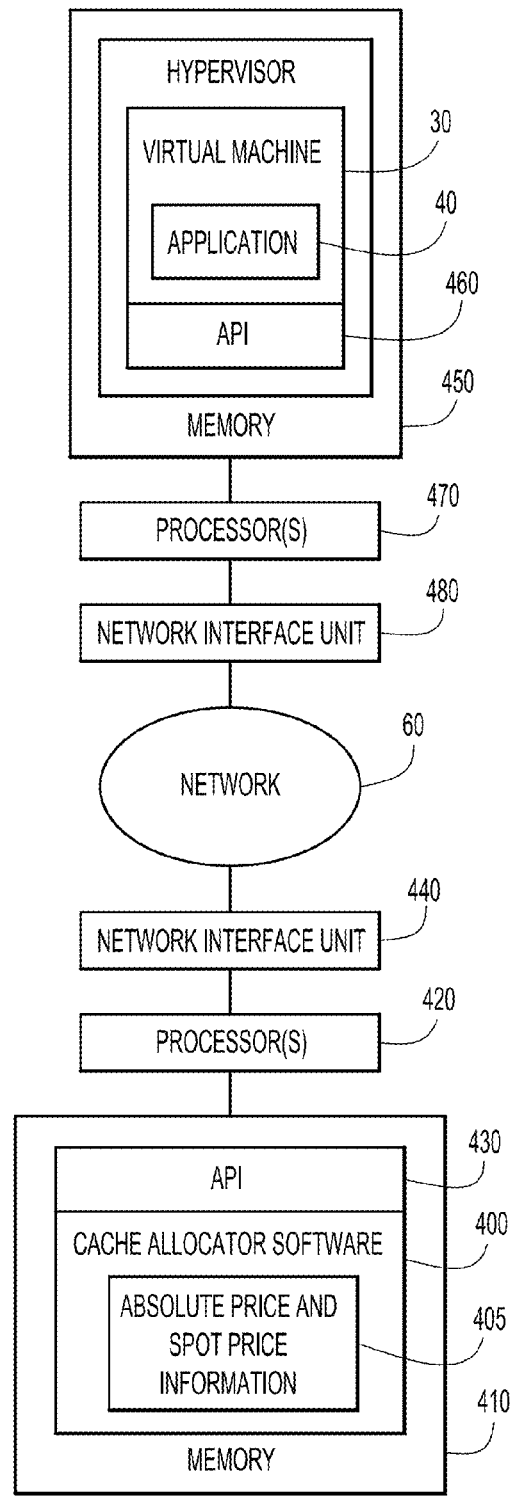

DYNAMIC CACHE ALLOCATING TECHNIQUES FOR CLOUD COMPUTING SYSTEMS

TECHNICAL FIELD

The present disclosure relates to cloud computing services.

BACKGROUND

In public cloud computing environments, tenants often will use or access a storage volume that has specific capabilities which are determined at the time of purchase, configuration, allocation or procurement. These capabilities can include capacity (in terms of MB/GB/TB) and Input/Output Operations per Second (IOPS). Such IOPS may be "read" or "write" operations of some size (16 kB for example). As tenants use this storage volume, they may determine that they need/require additional performance (IOPS). Typically this requires that the tenant procure a new volume and migrate or copy their data over to the new volume.

BRIEF DESCRIPTION OF THE DRAWINGS

FIG. 5 is a block diagram of computing equipment configured to perform the dynamic cache allocating techniques, according to an example embodiment.

DESCRIPTION OF EXAMPLE EMBODIMENTS

Overview

In one embodiment, techniques are presented to allow a tenant application in a cloud computing environment to automatically adjust storage infrastructure cache allocation according to performance needs and cost associated with use of the cache. Information is stored for a spot price of a cache of a storage infrastructure used for data storage in a cloud computing environment. The spot price represents a variable price per memory size allocation for use of the cache of the storage infrastructure and being determined based on supply and demand of the cache. A request is received to allocate additional cache for use by one or more applications associated with a first tenant running in the cloud computing environment. Information is sent to the one or more applications indicating a current spot price of the cache of the storage infrastructure. An instruction is received from the one or more applications to purchase the additional allocation of the cache based on the current spot price or based on a predetermined fixed price. An allocation request is sent to the storage infrastructure for additional allocation of the cache based on the current spot price or the predetermined fixed price.

Example Embodiments

Figure 1:
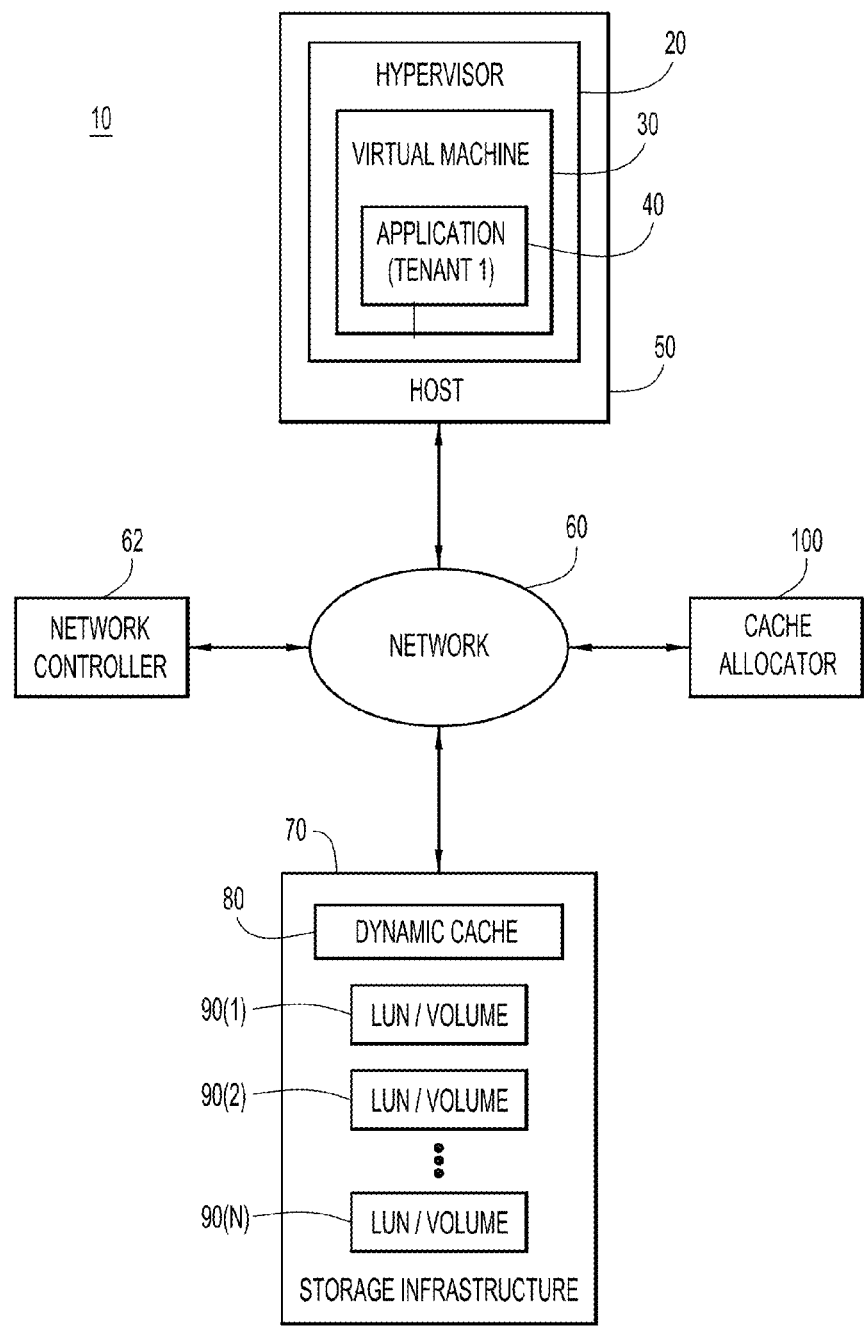
FIG. 1 is a block diagram of a cloud computing environment having a cache that can be dynamically allocated to a tenant according to an example embodiment.

Reference is first made to FIG. 1. FIG. 1 illustrates a cloud computing system 10 according to an example embodiment.

The system 10 includes a hypervisor 20 within which runs one more virtual machines (VMs). For simplicity, FIG. 1 shows that there is a single virtual machine 30 that runs in the hypervisor 20, and within virtual machine 30 there is an application 40. The virtual machine 30 is operated by the end user ("tenant"), and the application 40 is executed within the virtual machine 30. FIG. 1 shows that the application 40 is associated with Tenant 1. In the example shown in FIG. 1, the application 40 is the originator of input/output (IO) requests. In a real/actual system, there may be tens or hundreds of virtual machines running applications for one or multiple tenants.

It should be understood that a host 50 operated by a Cloud Operator ("Operator") runs one or more tenant VMs on the hypervisor 20. The host 50 virtualizes and consolidates IO streams from multiple VMs into one or more IO streams which are transported over a network.

A programmable network 60 is provided. The programmable network 60 is, in one example, an Application Programming Interface (API)-configurable Ethernet/Internet Protocol (IP) network capable of creating and enforcing policies, such as Quality of Service (QoS), and measuring network flows between a source and destination. To this end, there is a network controller 62 that is in communication with various network elements (switches, routers, firewalls, etc.) in the network 60 and is responsible for centrally managing and configuring the network elements in the network 60 in accordance with these policies. In one form, the network controller 62 may be a software-defined network (SDN) controller. The network controller 62 may be a separate/stand-alone server computer, or it may be an application running in the cloud computing system 10.

A storage infrastructure 70 is provided that includes a persistent storage medium (hard drives or solid state disk) (e.g., a storage array) and a high speed, low latency non-volatile (random access memory) caching mechanism, shown as dynamic cache 80. The dynamic cache 80 acknowledges IO requests and stores data prior to be de-staged to long term storage in one or more of the Logical Unit Number (LUN)/Volumes 90(1)-90(N). The performance of the dynamic cache 80 is at least an order of magnitude faster than the long term storage elements 90(1)-90(N).

A capability is provided to programmatically adjust, via a Representational State Transfer (RESTful) API for example, the ratio and allotment of dynamic cache 80 to long term storage, on a per volume, object, LUN or file system basis. Therefore it is possible to programmatically increase as well as decrease the amount of dynamic cache allocated to a given tenant.

A cache allocator 100 is provided. The cache allocator 100 is a software function running in the system 10 that maintains a variable price per KB/MB/GB for dynamic cache 80 within a given storage infrastructure. The cache allocator 100 provides two methods of purchase of dynamic cache resources: Absolute Price and Spot Price.

Absolute Price is used to purchase cache at a predetermined and fixed price. It is permanently associated with the volume, LUN, object or file system basis. Price is based on a $/minute per KB/MB/GB allocated basis.

Spot Price is a variable price based upon the supply of cache within the infrastructure/array. This price can rise when supply is low and fall when supply is high. Cache which is purchased and allocated via the Spot Price can be de-allocated if there is insufficient cache available to fulfill a request made at the Absolute Price. Cache which is no longer allocated to a tenant/application is not charged to the Tenant. The Spot Price is updated according to usage and demand of the cache 80.

In a traditional IO flow, the VM 30 issues an IO (read/write command), which is in turn interpreted by the hypervisor 20 and converted into a network stream. The network stream is transported over the network 60 to the storage infrastructure 70. The storage infrastructure 70 receive the IO from the network 60, and executes the operation (reads data or writes data) to its' internal structures. If possible, the storage infrastructure 70 will service the operation to cache (for writes) or if the data is already in cache, from cache (for reads). If the data is not in cache (a "cache miss") then the storage infrastructure 70 will read data from the long term storage. In current systems, the amount of cache allocated to a particular application/tenant is fixed by the cloud operator.

In many cases, the VM 30 experiences a slow down in performance. This is exhibited by a decrease in its ability to complete a set number of IOPS. The reduction in IOPS can be due to:

1. A lack of resources on the host 50 to process or queue the IO commands/data; or
2. The ability of the network 60 to deliver the IO; or
3. The inability of the storage infrastructure 70 to quickly process the IO request.

Presented herein are techniques to address the scenario when the storage infrastructure is unable to quickly process the IO requests due to a lack of allocated cache. The cache allocator 100 also sends a request to the network controller 62, which in response to the request, implements a requested policy (e.g., QoS) change, and then responds back with a success/failure message to the cache allocator 100.

Within the storage infrastructure is a ratio of cache to long term storage. For example, 10% of the long term storage is also cached. This provides a higher performance capability for 10% of the long term storage. The other 90% would be executed directly from the long term storage. An API would be available within the storage infrastructure 70 to be able to dynamically change the ratio of cache to long term storage. For example, the ratio may be changed dynamically and without a service interruption, e.g., from 10% to 25% or from 10 GB to 20 GB.

More specifically, techniques are presented herein to allow an end user (i.e., a tenant operating an application) to allocate more cache associated with the object, LUN or file system that the tenant is accessing to achieve improved performance. Conversely, cache may be dynamically de-allocated by a tenant.

Figure 2:
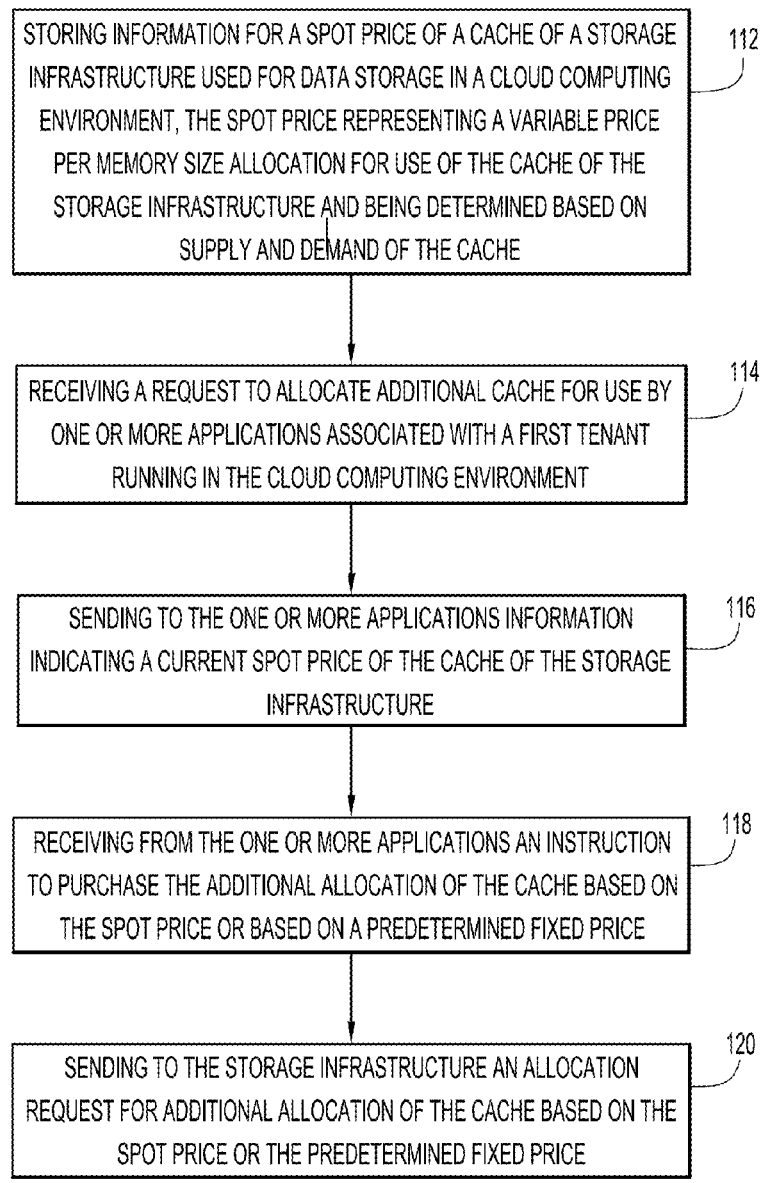
FIG. 2 is a high level flow chart depicting operations according to an example embodiment.

Turning now to FIG. 2, a high level flow chart of operations 110 of the cache allocator 100 is now described. At 112, the cache allocator 100 stores information for a spot price of a cache of a storage infrastructure used for data storage in a cloud computing environment. The spot price represents a variable price per memory size allocation for use of the cache of the storage infrastructure and is determined based on supply and demand of the cache. At 114, the cache allocator receives a request to allocate additional cache for use by one or more applications associated with a first tenant running in the cloud computing environment. At 116, the cache allocator sends to the one or more applications information indicating a current spot price of the cache of the storage infrastructure. At 118, the cache allocator receives from the one or more applications an instruction to purchase the additional allocation of the cache based on the current spot price or based on a predetermined fixed price. At 120, the cache allocator sends to the storage infrastructure an allocation request for additional allocation of the cache based on the current spot price or the predetermined fixed price.

Assuming, for sake of example, that the instruction received from the one or more applications associated with the first tenant specifies to purchase the additional allocation of cache is based on the spot price. At some subsequent point in time, a request may be received from a second tenant to purchase allocation of the cache at the predetermined fixed price. The cache allocator 100 will determine whether there is sufficient cache available to fulfill the request for allocation of the cache for the second tenant at the predetermined fixed price. If it is determined that there is insufficient cache available to fulfill the request for allocation of the cache for the second tenant at the predetermined fixed price, the additional cache is automatically de-allocated for use by the one or more applications of the first tenant.

Figure 3A:
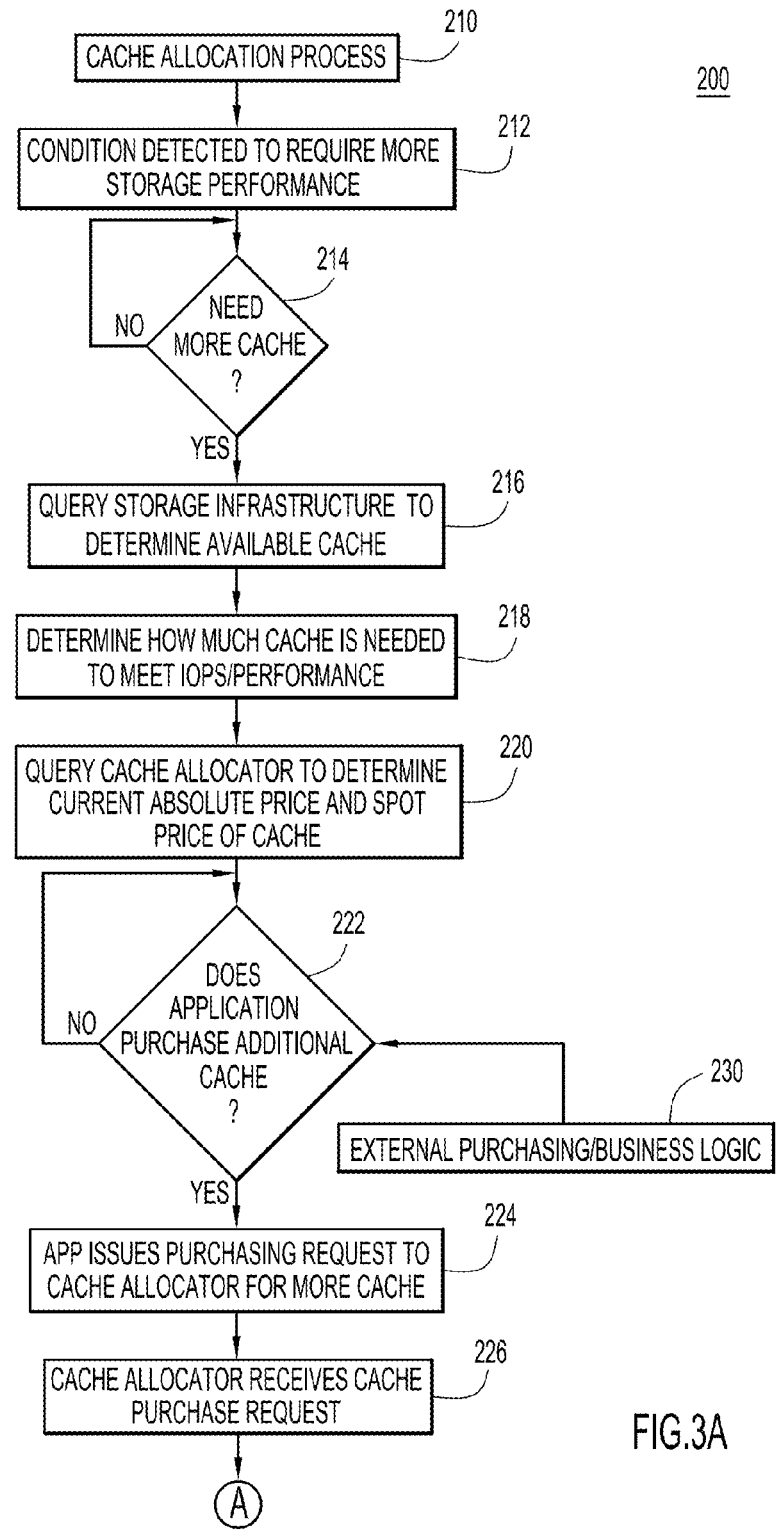
FIGS. 3A and 3B illustrate a detailed flow chart depicting operations for allocating cache for a tenant, according to an example embodiment.
Figure 3B:
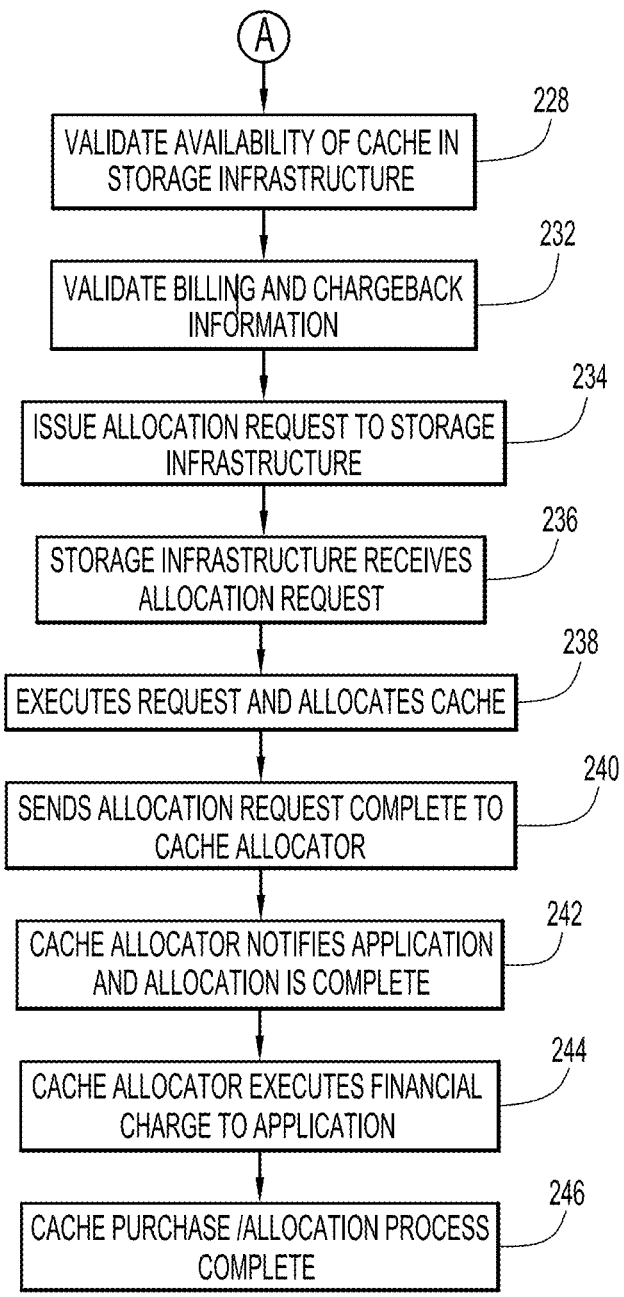

Reference is now made to FIGS. 3A and 3B, with continued reference to FIG. 1, for a description of a more detailed flow of actions of a cache allocation process 200, in accordance with an example embodiment. The cache allocation process begins at 210. At 212, the application 40 or VM 30 for a particular tenant detects a condition that requires more storage performance. For example, the application or VM detects that:

(a) The number of IOPS being executed is decreasing (indicating that performance is being lost due to insufficient cache); or
(b) The working data set of most commonly accessed data (measured in records, KB, MB, GB) has increased; or
(c) A workload is about to start which requires an increase in IOPS.

At 214, based on the condition detected at 212, it is determined that more cache is needed.

At 216, the application queries the storage infrastructure to determine how much cache in terms of percentage or absolute capacity (KB/MB/GB) is being used, and thus how much cache is available.

At 218, the application determines how much additional cache will need to be allocated to meet the IOPS/performance detected to be needed at 212. At 220, the application queries the cache allocator 100 to determine the Absolute Price and the current Spot Price of cache.

At 222, the application makes a determination, based upon the application's purchasing/business logic 230, whether to purchase additional cache. If it is determined at 222 to purchase additional cache, then at 224, the application issues a purchasing request to the cache allocator 10 via a RESTful API call to allocate additional cache for the workload/volume/LUN/object.

At 226, the cache allocator 100 receives the purchasing request. At 228, the cache allocator 100 validates the availability of cache in the storage infrastructure 70. At 232, the cache allocator validates billing and chargeback information for the requesting application. Assuming billing and chargeback information are validated, then at 234, the cache allocator 100 issues to the storage infrastructure 70 an allocation request to increase the cache allotment for the workload/volume/LUN/object.

At 236, the storage infrastructure receives the allocation request. At 238, the storage infrastructure 70 executes the allocation request to modify the allotment of cache to long term storage ratio. At 240, the storage infrastructure 70 sends an allocation request complete to the cache allocator.

At 242, the cache allocator 100 sends a RESTful API notification to the application 40 that the requested allocation is complete, e.g., that the amount of cache has been increased for the specified workload/volume/LUN/object. At 244, the cache allocator 100 issues a financial charge to the application owner/tenant.

The cache allocator 100, after configuring the storage infrastructure 70 to allocate more cache, issues a request to the network controller 62 (FIG. 1) that manages QoS policy of the programmable network 60 to provide a minimum amount of bandwidth equal to that of a number of IOPS*blocksize, where blocksize is a standardized number such as 16 KB and the number of IOPS is a factor determined by the amount of cache requested. For example, 1000 IOPS may be allocated for every GB of cache allocated. Therefore, the network controller 62 configures the elements in the network 60 to ensure that 1000*16 KB of bandwidth is available between the VM 30 and the storage infrastructure 70. Thus, to summarize this feature, the cache allocator 100 sends to the network controller 62 that manages the network 60 over which the one or more applications communicate with the storage infrastructure 70, a request for a minimum amount of bandwidth for traffic in the network 60 for the first tenant based on an amount of cache allocated to the one or more applications for the first tenant.

Figure 4:
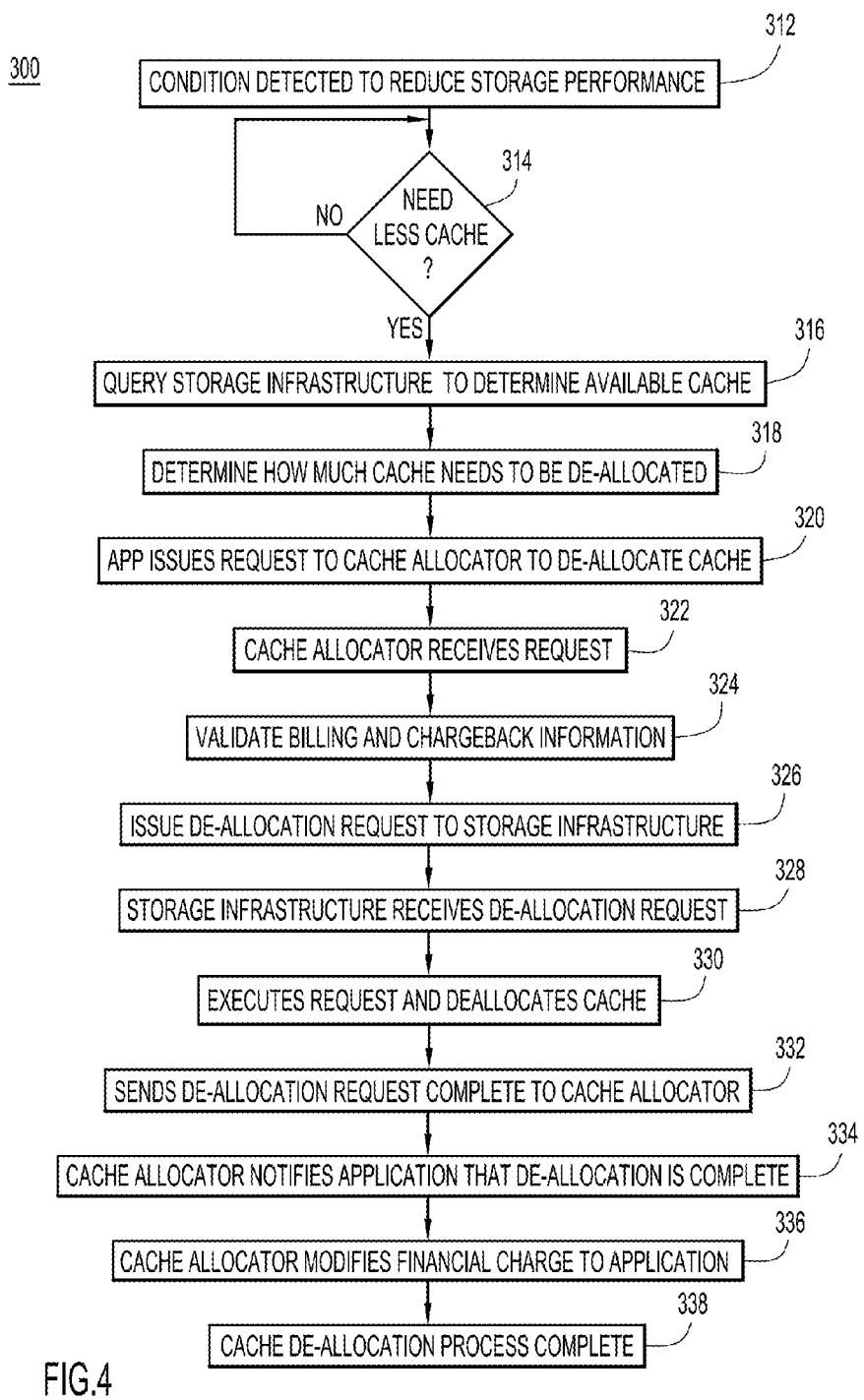
FIG. 4 is a detailed flow chart depicting operations for de-allocating cache for a tenant, according to an example embodiment.

Conversely, a scenario may take place whereby a tenant is attempting to reduce expenses and needs to reduce the amount of cache used. Reference is made to FIG. 4 (also with continued reference to FIG. 1) for an example flow of actions 300 for reducing the amount of cache that a tenant uses. At 312, the application or VM detects a condition to reduce storage performance. For example, the number of IOPS required is decreasing and/or the working data set of most commonly accessed data (measured in records, KB/MB/GB) has decreased. Further, a high IOPS workload may have been completed and therefore fewer IOPS is required.

At 314, the application 40 has determined that it requires less cache. At 316, the application 40 queries the storage infrastructure 70 to determine how much cache is available (in terms of percentage or absolute capacity (KB/MB/GB) is being used). At 318, the application 40 determines how much cache will need to be de-allocated. At 320, the application 40 issues a purchasing request to the cache allocator via a RESTful API call to de-allocate cache for the workload/volume/LUN/object.

At 322, the cache allocator 100 receives the request for de-allocating cache, and at 324, validates billing and chargeback information. At 326, the cache allocator 100 issues a de-allocation request to the storage infrastructure 70 to decrease cache allotment for the workload/volume/LUN/object.

At 328, the storage infrastructure 70 receives the de-allocation request. At 330, the storage infrastructure 70 executes the de-allocation request to modify the allotment of cache to long term storage ratio. At 332, the storage infrastructure 70 sends a de-allocation request complete to the cache allocator 100. At 334, the cache allocator 100 notifies the application 40, via a RESTful API notification, for example, that the amount of cache has been reduced for the specified workload/volume/LUN/object. At 336, the cache allocator 100 modifies the amount currently being charged for cache allotment to the application owner (tenant). At 338, the cache de-allocation process is complete.

Reference is now made to FIG. 5. FIG. 5 illustrates a hardware block diagram of the cloud computing system 10. In one form, the cache allocator is embodied in software, that is cache allocator software 400, residing in memory 410 and executed by processor(s) 420. The cache allocator software 400 stores information 405 specifying the Absolute Price and Spot Price of the cache in the storage infrastructure. The Spot Price will be adjusted upwards and downwards depending on supply and demand of the cache 80 at any point in time.

The cache allocator software 400 also implements an API shown at 430 to enable communication with the application 40. In the case that the cache allocator software 400 is executed by a computing device that is different from the computing device that executes the hypervisor 20, VM 30 and application 40, a network interface unit 440 is provided to enable network communication between the different computing devices.

FIG. 5 also shows that the hypervisor 20, VM 30 and application 40 are embodied as software that resides in memory 450. An API 460 enables communication between the application 40 and the cache allocator software 410. The processor(s) 470 execute the instructions stored in memory for the application 40. A network interface unit 480 is provided to enable network communication on behalf of the application 40.

The memory 410 and memory 450 may comprise read only memory (ROM), random access memory (RAM), magnetic disk storage media devices, optical storage media devices, flash memory devices, electrical, optical, or other physical/tangible memory storage devices. Thus, in general, the memory 130 may comprise one or more tangible (non-transitory) computer readable storage media (e.g., a memory device) encoded with software comprising computer executable instructions and when the software is executed (by a processor) it is operable to perform the operations described herein.

The techniques presented herein provide spot pricing scheme that enables cloud tenants to automatically allocate additional storage caching to increase IO performance based upon application demand and current market price. Using these techniques, cloud tenants may dynamically allocate cache to their application workload through a centralized service. This allows tenants to either purchase cache permanently at a higher price or at a "market price" which is lower but the tenant runs the risk of losing the additionally allocated cache if demand from other tenants changes. This allows for a finite technical resource to be allocated on demand.

In one form, a computer-implemented method is provided comprising: storing information for a spot price of a cache of a storage infrastructure used for data storage in a cloud computing environment, the spot price representing a variable price per memory size allocation for use of the cache of the storage infrastructure and being determined based on supply and demand of the cache; receiving a request for allocation of additional cache for use by one or more applications associated with a first tenant running in the cloud computing environment; sending to the one or more applications information indicating a current spot price of the cache of the storage infrastructure; receiving from the one or more applications an instruction to purchase the allocation of additional cache based on the current spot price or based on a predetermined fixed price; and sending to the storage infrastructure an allocation request for allocation of the additional cache based on the current spot price or the predetermined fixed price.

In another form, a non-transitory computer readable storage media is provided encoded with instructions that, when executed by a computer, cause the computer to perform operations comprising: storing information for a spot price of a cache of a storage infrastructure used for data storage in a cloud computing environment, the spot price representing a variable price per memory size allocation for use of the cache of the storage infrastructure and being determined based on supply and demand of the cache; receiving a request for allocation of additional cache for use by one or more applications associated with a first tenant running in the cloud computing environment; sending to the one or more applications information indicating a current spot price of the cache of the storage infrastructure; receiving from the one or more applications an instruction to purchase the allocation of additional cache based on the current spot price or based on a predetermined fixed price; and sending to the storage infrastructure an allocation request for allocation of the additional cache based on the current spot price or the predetermined fixed price.

In still another form, a system is provided comprising: a storage infrastructure subsystem including at least one storage array and non-volatile cache memory; a computer subsystem running one or more applications associated with a first tenant, wherein the computer subsystem interfaces with the storage infrastructure subsystem; and a processor that is communication with the storage infrastructure subsystem and the computer subsystem, wherein the processor: stores information for a spot price of the cache memory, the spot price representing a variable price per memory size allocation for use of the cache memory determined based on supply and demand of the cache memory; receive a request for allocation of additional cache for use by one or more applications associated with a first tenant running in the cloud computing environment; causes information indicating a current spot price of the cache memory to be sent to the one or more applications; receives from the one or more applications an instruction to purchase the allocation of additional cache memory based on the current spot price or based on a predetermined fixed price; and causes to be sent to the storage infrastructure subsystem an allocation request for the allocation of additional cache memory based on the current spot price or the predetermined fixed price.

The above description is intended by way of example only. Various modifications and structural changes may be made therein without departing from the scope of the concepts described herein and within the scope and range of equivalents of the claims.

What is claimed is:

1. A computer-implemented method comprising:
    storing information for a spot price of a cache of a storage infrastructure used for data storage in a cloud computing environment, the spot price representing a variable price per memory size allocation for use of the cache of the storage infrastructure and being determined based on supply and demand of the cache;
    receiving a request for allocation of additional cache for use by one or more applications associated with a first tenant running in the cloud computing environment;
    sending, to the one or more applications, information indicating a current spot price of the cache of the storage infrastructure;
    receiving, from the one or more applications, an instruction to purchase the allocation of additional cache based on the current spot price or based on a predetermined fixed price;
    sending, to the storage infrastructure, an allocation request for allocation of the additional cache based on the current spot price or the predetermined fixed price;
    receiving from one or more applications associated with a second tenant a request to purchase allocation of the cache at the predetermined fixed price;
    determining whether there is sufficient cache available to fulfill the request for allocation of the cache for the second tenant at the predetermined fixed price;
    automatically de-allocating the additional cache for use by the one or more applications of the first tenant if it is determined that there is insufficient cache available to fulfill the request for allocation of the cache for the second tenant so as to fulfill the request for allocation of the cache for the second tenant; and
    sending, to a network controller that manages a network over which the one or more applications communicate with the storage infrastructure, a request for a minimum amount of bandwidth for traffic in the network for the first tenant based on an amount of cache allocated to the one or more applications for the first tenant.

2. The method of claim 1, wherein the instruction received from the one or more applications specifies to purchase the allocation of additional cache based on the current spot price.

3. The method of claim 2, further comprising determining whether there is availability in the cache for the allocation of additional cache contained in the request.

4. The method of claim 2, further comprising:
    receiving, from the storage infrastructure, an allocation request complete notification that indicates that the allocation of additional cache has been completed; and
    sending a notification to the one or more applications to indicate that the allocation of additional cache is complete.

5. The method of claim 4, further comprising executing a financial charge to the first tenant for the allocation of additional cache.

6. The method of claim 1, further comprising:
    receiving a request from the one or more applications to de-allocate the additional cache; and
    sending a de-allocation request to the storage infrastructure to de-allocate the additional cache for the one or more applications.

7. The method of claim 6, further comprising receiving a de-allocation complete notification from the storage infrastructure indicating that the allocation of additional cache has been de-allocated.

8. The method of claim 7, further comprising adjusting financial charges to the first tenant for the de-allocation of the additional cache.

9. The method of claim 1, wherein the request for allocation of additional cache is generated by the one or more applications associated with the first tenant based on a determination that a number of Input/Output Operations per Second (IOPS) being executed is decreasing, a working data set of most commonly accessed data has increased, or a workload is about to start which requires an increase in IOPS.

10. A non-transitory computer readable storage media encoded with instructions that, when executed by a computer, cause the computer to perform operations comprising:
    storing information for a spot price of a cache of a storage infrastructure used for data storage in a cloud computing environment, the spot price representing a variable price per memory size allocation for use of the cache of the storage infrastructure and being determined based on supply and demand of the cache;
    receiving a request for allocation of additional cache for use by one or more applications associated with a first tenant running in the cloud computing environment;

sending, to the one or more applications, information indicating a current spot price of the cache of the storage infrastructure;

receiving, from the one or more applications, an instruction to purchase the allocation of additional cache based on the current spot price or based on a predetermined fixed price;

sending, to the storage infrastructure, an allocation request for allocation of the additional cache based on the current spot price or the predetermined fixed price;

receiving from one or more applications associated with a second tenant a request to purchase allocation of the cache at the predetermined fixed price;

determining whether there is sufficient cache available to fulfill the request for allocation of the cache for the second tenant at the predetermined fixed price;

automatically de-allocating the additional cache for use by the one or more applications of the first tenant if it is determined that there is insufficient cache available to fulfill the request for allocation of the cache for the second tenant so as to fulfill the request for allocation of the cache for the second tenant; and sending, to a network controller that manages a network over which the one or more applications communicate with the storage infrastructure, a request for a minimum amount of bandwidth for traffic in the network for the first tenant based on an amount of cache allocated to the one or more applications for the first tenant.

11. The non-transitory computer readable storage media of claim 10, wherein the instruction received, from the one or more applications, specifies to purchase the allocation of additional cache based on the spot price.

12. The non-transitory computer readable storage media of claim 11, further comprising instructions that, when executed by the computer, cause the computer to perform operations comprising:
determining whether there is availability in the cache for the allocation of additional cache contained in the request.

13. The non-transitory computer readable storage media of claim 11, further comprising instructions that, when executed by the computer, cause the computer to perform operations comprising:
receiving, from the storage infrastructure, an allocation request complete notification that indicates that the allocation of additional cache has been completed;
sending a notification to the one or more applications to indicate that the allocation of additional cache is complete; and
executing a financial charge to the first tenant for the allocation of additional cache.

14. The non-transitory computer readable storage media of claim 10, further comprising instructions that, when executed by the computer, cause the computer to perform operations comprising:
receiving a request from the one or more applications to de-allocate the additional cache; and
sending a de-allocation request to the storage infrastructure to de-allocate the additional cache for the one or more applications.

15. The non-transitory computer readable storage media of claim 14, further comprising instructions that, when executed by the computer, cause the computer to perform operations comprising:
receiving a de-allocation complete notification from the storage infrastructure indicating that the allocation of additional cache has been de-allocated; and
adjusting financial charges to the first tenant for the de-allocation of the additional cache.

16. The non-transitory computer readable storage media of claim 10, wherein the request to allocate additional cache is generated by the one or more applications associated with the first tenant based on a determination that a number of Input/Output Operations per Second (IOPS) being executed is decreasing, a working data set of most commonly accessed data has increased, or a workload is about to start which requires an increase in IOPS.

17. A system comprising:
a storage infrastructure subsystem including at least one storage array and non-volatile cache memory;
a computer subsystem running one or more applications associated with a first tenant, wherein the computer subsystem interfaces with the storage infrastructure subsystem; and
a processor that is in communication with the storage infrastructure subsystem and the computer subsystem, wherein the processor:
stores information for a spot price of the cache memory, the spot price representing a variable price per memory size allocation for use of the cache memory determined based on supply and demand of the cache memory;
receives a request for allocation of additional cache for use by one or more applications associated with a first tenant running in the cloud computing environment;
causes information indicating a current spot price of the cache memory to be sent to the one or more applications;
receives, from the one or more applications, an instruction to purchase the allocation of additional cache memory based on the current spot price or based on a predetermined fixed price;
causes to be sent, to the storage infrastructure subsystem, an allocation request for the allocation of additional cache memory based on the current spot price or the predetermined fixed price;
receives from one or more applications associated with a second tenant a request to purchase allocation of the cache memory at the predetermined fixed price;
determines whether there is sufficient cache available to fulfill the request for allocation of the cache memory for the second tenant at the predetermined fixed price;
automatically de-allocates the additional cache memory for use by the one or more applications of the first tenant if it is determined that there is insufficient cache memory available to fulfill the request for allocation of the cache memory for the second tenant so as to fulfill the request for allocation of the cache for the second tenant; and
causes to be sent, to a network controller that manages a network over which the one or more applications communicate with the storage infrastructure, a request for a minimum amount of bandwidth for traffic in the network for the first tenant based on an amount of cache allocated to the one or more applications for the first tenant.

18. The system of claim 17, wherein the instruction received from the one or more applications specifies to purchase the allocation of additional cache memory based on the spot price.

19. The system of claim 18, wherein the processor further:

determines whether there is availability in the cache memory for the allocation of additional cache memory contained in the request;

receives, from the storage infrastructure subsystem, an allocation request complete notification that indicates that the allocation of additional cache memory has been completed;

causes to be sent, to the one or more applications, a notification to indicate that the allocation of additional cache memory is complete; and executes a financial charge to the first tenant for the allocation of additional cache memory.

20. The system of claim 18, wherein the processor further:

receives a request from the one or more applications to de-allocate the additional cache memory; and causes to be sent, to the storage infrastructure subsystem, a de-allocation request to de-allocate the allocation of additional cache memory for the one or more applications.

21. The system of claim 20, wherein the processor further:

receives a de-allocation complete notification from the storage infrastructure indicating that the allocation of additional cache memory has been de-allocated; and adjusts financial charges to the first tenant for the de-allocation of the additional cache memory.

22. The system of claim 17, wherein the request to allocate additional cache memory is generated by the one or more applications associated with the first tenant based on a determination that a number of Input/Output Operations per Second (IOPS) being executed is decreasing, a working data set of most commonly accessed data has increased, or a workload is about to start which requires an increase in IOPS.

\* \* \* \* \*